(12) United States Patent
Hasenkamp et al.

(10) Patent No.: US 6,432,237 B1
(45) Date of Patent: Aug. 13, 2002

(54) SURFACE IMPROVING PROCESS

(75) Inventors: Rainer Hasenkamp, Bopfingen; Lothar Thiele, Langenfeld, both of (DE)

(73) Assignees: Henkel Kommanditgesellschaft auf Aktien, Duesseldorf; Dorus Klebetechik GmbH and Co. KG, Bopfinger, both of (DE)

( * ) Notice: Subject to any disclaimer, the term of this patent is extended or adjusted under 35 U.S.C. 154(b) by 0 days.

(21) Appl. No.: 09/230,365

(22) PCT Filed: Jul. 17, 1997

(86) PCT No.: PCT/EP97/03832

§ 371 (c)(1),
(2), (4) Date: Feb. 19, 1999

(87) PCT Pub. No.: WO98/04390

PCT Pub. Date: Feb. 5, 1998

(30) Foreign Application Priority Data

Jul. 26, 1996 (DE) .......................... 196 30 270

(51) Int. Cl.[7] .......................... B32B 5/18; B32B 31/26
(52) U.S. Cl. .......................... 156/79; 156/247; 264/46.4; 264/46.5; 427/373
(58) Field of Search .......................... 264/46.4, 46.5; 156/78, 79, 247; 427/373

(56) References Cited

U.S. PATENT DOCUMENTS

| | | | | |
|---|---|---|---|---|
| 2,961,332 A | * | 11/1960 | Nairn .......................... | 427/373 |
| 3,108,009 A | * | 10/1963 | Clancy et al. .............. | 427/373 |
| 3,278,322 A | * | 10/1966 | Harkins, Jr. et al. ........ | 427/373 |
| 3,301,741 A | * | 1/1967 | Henrickson et al. ........ | 156/247 |
| 3,339,107 A | * | 8/1967 | Biskup et al. .............. | 427/375 |
| 3,539,388 A | * | 11/1970 | Tu .............................. | 427/373 |
| 3,595,203 A | | 7/1971 | Fabulich ........................ | 118/2 |
| 3,896,199 A | * | 7/1975 | Michaelis .................... | 156/79 |
| 3,897,581 A | * | 7/1975 | Nakatsuka et al. ........... | 156/79 |
| 3,907,624 A | | 9/1975 | Gravely, Jr. ................. | 156/214 |
| 3,967,581 A | | 7/1976 | Zirbel ........................... | 118/2 |
| 4,310,370 A | * | 1/1982 | Arai et al. .................... | 156/247 |
| 4,597,831 A | * | 7/1986 | Anderson .................... | 427/373 |
| 4,655,868 A | * | 4/1987 | Hefele ......................... | 156/247 |
| 5,085,891 A | | 2/1992 | Evans ........................... | 427/277 |
| 5,308,657 A | | 5/1994 | Markusch et al. .......... | 427/284 |
| 5,360,504 A | * | 11/1994 | Fell et al. .................... | 156/247 |
| 5,436,069 A | | 7/1995 | Winterowd et al. ....... | 428/308.8 |
| 5,635,248 A | * | 6/1997 | Hsu et al. .................... | 264/46.4 |
| 5,861,119 A | * | 1/1999 | Merser ........................ | 156/78 |

FOREIGN PATENT DOCUMENTS

| | | |
|---|---|---|
| AU | 83/16705 | 12/1983 |
| DE | 19 37 847 | 2/1970 |
| DE | 22 33 322 | 1/1973 |
| DE | 36 31 325 | 10/1987 |
| DE | 39 12 742 | 12/1989 |
| DE | 44 42 397 | 11/1994 |
| DE | 195 43 901 | 5/1996 |
| EP | 0 744 260 | 11/1996 |
| WO | WO84/04262 | 11/1984 |

* cited by examiner

*Primary Examiner*—Allan R. Kuhns
(74) *Attorney, Agent, or Firm*—Stephen D. Harper; Daniel S. Ortiz

(57) ABSTRACT

The uneven surfaces of wood-based materials such as chipboard may be improved by applying a formable coating material, smoothing and/or modelling the coating material to achieve a smoother surface, and heating the coating material to form closed pores while maintaining the smoothed surface intact. Decorative and flexible layers may also be applied to such surfaces in this manner

60 Claims, No Drawings

SURFACE IMPROVING PROCESS

FIELD OF THE INVENTION

This invention relates to a process and an assembly for improving surfaces, preferably uneven narrow surfaces, of wood-based materials.

BACKGROUND OF THE INVENTION

Surface treatment processes of the type in question are widely used in the furniture industry. This is because the wood-based materials used in the furniture industry are not left in their original state, but are given an improving surface coating, mostly a melamine coating. The coating materials used also include veneers, decorative laminates or decorative films.

A special edge material is often used for coating sides, edges or, generally, narrow surfaces. This special edge material may be, for example, an edge veneer or a so-called narrow-surface band which is applied to the narrow surfaces by means of an adhesive. This process is known generally as edge banding.

However, it is often desirable to round off the narrow surfaces or edges on aesthetic grounds or to provide profiled surfaces for functional reasons. Other coating techniques besides edge banding, which is also known as soft forming, are used in the coating of such "soft" contours.

One of the reasons for wanting to improve surfaces is that the surfaces to be coated are often very uneven, full of voids, etc. This applies in particular to chipboards.

When coated by one of the processes mentioned above, surfaces such as these become noticeably uneven, "bumpy" or undulating which spoils the appearance of subsequent pieces of furniture for example. To obtain an improvement, thicker edge or coating materials are often used because they are able sufficiently to level out any unevenness in the surface and to avoid so-called telegraphing of the substrate. However, any increase in the thickness of the material is accompanied by an increase in the resilience of the bent coating material. This in turn means that a longer contact pressure zone is required for bonding the stiffer coating material. Moreover, thicker coating materials are generally more expensive.

The process and assembly described in DE 44 42 397 for treating surfaces, more especially narrow surfaces, are better. Here, a formable coating material is applied and smoothed by means of a smoothing band. However, the surfaces obtained are again not smooth enough for all applications.

SUMMARY OF THE INVENTION

Accordingly, the problem addressed by the invention was to provide a possibility by which the disadvantages mentioned above could be eliminated and which would enable surfaces to be smoothed in a simple manner.

The present invention provides a process comprising the steps of applying a formable coating material to a wood-based material, forming the applied formable coating material by smoothing, modelling or both smoothing and modelling to achieve a smoothed surface on the wood-based material, and heating the applied formable coating to form closed pores while maintaining said smoothed surface intact.

In embodiment of the invention, the process comprises the steps of applying a formable coating material to decorative layer, pressing the decorative layer with the formable coating material applied thereto against a wood-based material to achieve a smoothed surface on said wood-based material, and heating the applied formable coating material to form closed pores while maintaining said smoothed surface intact.

The present process may in another embodiment comprise the steps of applying a formable coating material to a flexible layer having and adhesive-repellent coating, pressing the flexible layer with the formable coating material applied thereto against a wood-based material to achieve a smoothed surface on said wood-based material, heating the applied formable coating material to form closed pores while maintaining said smoothed surface intact, and removing the flexible layer from said smoothed surface.

DETAILED DESCRIPTION OF THE INVENTION

The coating material is applied, for example, by a roller, an adjustable slot die or a transfer tape, preferably to the edge band (edge veneer). However, it may also be applied to the wood-based material. It is preferably applied to the surface by means of a transfer tape. This has the advantage that there is no need for an applicator roller adapted to the profile to be coated in order to apply the material. The manufacture of such profile-adapted applicator rollers or even specially adapted application nozzles is time-consuming and extremely expensive, especially where large numbers of different edge profiles are involved. In addition, different profiles cannot be coated in a short time.

The coating material is preferably applied to the surface to be treated by pressure. A suitable pressure element applies a force to the band on its uncoated side so that the coated side of the transfer tape is pressed onto the surface to be coated.

Application of the coating material is improved by additional heat treatment of the coating material or wood-based material. Infrared heaters, hot air fans, high-frequency heaters or the like are preferably used for this purpose.

In one preferred embodiment of the process/assembly according to the invention, the coating material is applied to the transfer tape immediately before application to the surface to be coated. This is preferably done using a suitable applicator roller or an application nozzle which applies the material to the transfer tape in an adjustable thickness. In determining the material thickness, it is of advantage to increase it in the middle part of the transfer tape. As mentioned above, surface unevenness is at its greatest in particular in this region of the surface to be coated with the result that more material has to be used there.

In another advantageous embodiment of the invention, the transfer tape is removed from the surface to be treated, the material having previously penetrated into and set or hardened in the pores of the surface to be treated so that it does not stick to the transfer tape when it is removed.

Another advantageous embodiment of the invention is characterized in that, after removal, the transfer tape is returned to the application system so that an endless tape can be used.

The transfer tape is preferably also used as a smoothing tape so that there is no need for smoothing rollers or smoothing blocks.

However, smoothing or modelling can also be carried out by other known methods, for example by rollers and coating knives or by sanding after spray application.

Further information on application and smoothing can be found in the relevant literature, cf. in particular DE 44 42 397 to which reference is expressly made.

The coating materials used may be both solid and non-solid, for example thixotropic, paste-like or highly viscous, at room temperature.

Where importance is attached to simple processing and not to the particular performance properties of a thermoset material, thermoplastic materials are preferably used for coating. On the one hand, they combine well with the surface and, on the other hand, they are readily formable or smoothable.

In order to enable commercially available hot melt applicators to be used to apply the thermoplastic coating material, the thermoplastic material should be sufficiently free-flowing during application. Good free flow of the material is important insofar as it is thus able better to wet the transfer tape, can be better applied to the narrow surface to be coated and, in addition, can penetrate better into the pores of the chipboard. To avoid excessive penetration, that side of the coating or the transport tape remote from the narrow side is cooled, for example by means of a cold air blower or a cooling roller. That part of the coating material in contact with the transport tape thus hardens very quickly so that it "sinks" less into the surface. This effect can be increased by foaming.

In addition, reactive non-thermoplastic materials can be used for coating. Specific examples of such materials include one-component or two-component systems based on polyurethanes, polyesters, poly(meth)acrylates and epoxides. They may contain additives, for example fillers, pigments, dyes, thixotropicizing agents, catalysts and stabilizers. Decorative edges can be directly obtained by adding pigments or dyes.

Where reactive coating materials are used, it is important to avoid temperatures at which they harden by crosslinking in the mixing and metering units or during application and smoothing.

In addition, the coating material should lend itself to bonding, i.e. it should have a high affinity for the decorative layer applied at the same time or at a later stage.

The coating material or the wood-based material contains a "blowing" agent which forms pore-forming gases under the effect of the heated metal shoe. In the most simple case, the blowing agent is a readily volatile substance, for example water, a low-viscosity hydrocarbon or halogenated hydrocarbon. However, it may also be a substance which decomposes and forms gases, for example N,N'-azobisisobutyronitrile, toluene-4-sulfonyl semicarbazide, 4,4'-hydroxy-bis-(benzenesulfone hydrazide) or azodicarboxylic acid diamide.

However, these pore-forming gases may also be formed during the hardening reaction of the reactive coating composition, for example $CO_2$ during the reaction of isocyanates with water. The hardening temperature and the hardening time are entirely dependent on the processing techniques and the coating materials used. In general, the temperatures are in the range from 50 to 250° C. and, more particularly, in the range from 80 to 180° C. while the contact times are between 1 and 300 seconds and, more particularly, between 2 and 20 seconds. Accordingly, this affords the advantage that the wood-based material can be continuously processed or at best only brief stoppages are necessary, depending on the layer thickness of the coating material.

The necessary heating unit may consist of a large metal block (heating shoe) which is heated to the necessary temperature by, for example, a heating cartridge. It is of advantage to use several small heating shoes, which can be variably adapted to varying contoured edge surfaces, rather than a single large heating shoe. The metal block can be shaped in such a way that it also has a smoothing effect (heating shoe). If the smoothing composition to be hardened is applied by the transfer tape to a contoured chipboard edge, the heating shoe has to be shaped in such a way or the group of small heating shoes has to be arranged in such a way that the flexible transfer tape is pressed onto the edge following all the contours or with any other required shape. It is important to use a flexible transfer tape which withstands the considerable heating involved in long-term use and transfers the heat to the smoothing composition to be hardened. It has been found in practice that glass-fibre- or Kevlar-reinforced teflonized bands (usable up to 260° C.), for example, are suitable. A thin teflonized steel band may also be used.

In addition, it was found in the trials conducted thus far that the chipboard with its specific layer structure poses problems insofar as, although the anchorage and hence the adhesion of the smoothing composition in the porous middle part are good, adequate adhesion in the more highly compressed marginal zones can only be achieved with low-viscosity smoothing compositions. Here, it was found that roughening of the margins leads to a better, satisfactory result. Machine roughening can be carried out inexpensively in a one-pass machine using commercially available tools.

The described coating process may be used in particular for wood-based materials, such as solid wood, chipboards, blackboards, coreboards or plywood. However, the described process may also be used to coat uneven plastic materials or metals.

Besides smoothing surfaces, the coating material also offers protection against mechanical stressing. For example, metal rails on the edges of concrete formwork boards can be replaced by a coating of a material which hardens to form a thermoset. Other applications are of course also possible.

Thus, a decorative layer can be laminated onto the smoothed narrow surface, preferably at the same time as the hardening process. Edges of PVC, ABS, PP or wood (veneer) may be used as the decorative layer. They may comprise one or more layers (laminate edges). Resin-impregnated paper in particular is used.

If, for example, a two-component polyurethane system is applied to the decorative edge material and if this adhesive-coated edge band is bonded to a straight or contoured edge of a chipboard, the thermoset-forming hardening process can surprisingly be accelerated by a heating shoe so that, immediately after leaving the heating unit, it has advanced sufficiently for the subsequent steps (milling, capping). The polyurethane system is advantageously formulated in such a way that it reacts sufficiently quickly, but does not lead to troublesome hardening reactions in the mixing head itself. Accordingly, subsequent heating with the heating shoe enables an edge band to be bonded in-line onto the edge of the chipboard. Since the PUR adhesive hardens to form a thermoset, the bond is highly resistant to heat and water, as required for example for kitchen and bathroom furniture. The expert would not have expected the combination of a quick-curing, but readily processable reactive coating material with a heated heating shoe to allow such rapid machine bonding that the subsequent processing steps, such as milling and capping of the edge overhang, can be carried out shortly thereafter, thus ensuring continuous production. In addition, the bond established is remarkably impervious.

The process according to the invention is applicable to the surface improvement of a wood-based workpiece not only by the edge banding of straight edges and by softforming (curved edges), but also by postforming, profile jacketing and 3D jacketing.

The following observations are intended to explain these three processes. If, in the case of an elongate wood-based board, one of the two major surfaces and at least one of the two longitudinal edges rounded in some way are laminated with one and the same coating material, preferably a decorative laminate, such as CPL or HPL, the process in question is known as postforming. If not only the two longitudinal edges but also the surface of a long narrow wood-based material are profiled and if this profile workpiece is laminated with a decorative coating material, the process in question is known as profile jacketing. In so-called 3D jacketing (3D=three-dimensional), also commonly known as thermoforming, veneer or a thermoplastic film, mostly of PVC, is laminated in thermoforming presses—with or without a membrane—to a wood-based panel which is decoratively profiled on all four sides and possibly even on its flat surface.

Workpieces of a wood-based material with an uneven surface can be used in the above-mentioned processes after smoothing (particularly of the rough porous sides by the described process).

In all the processes mentioned, however, smoothing and lamination with a decorative coating material can be carried out simultaneously. This is shown in Example 4 for edge banding.

The invention is illustrated by the following Examples.

I Starting Materials

1. Reactive adhesive 1 is a one-component polyurethane based on MDI and polypropylene glycol.
2. Reactive adhesive 2 is a two-component $CaCO_3$-filled polyurethane based on crude MDI and castor oil.
3. Reactive adhesive 3 is a two-component system of a bisphenol A diepoxide and an amine hardener with an accelerator.
4. Reactive adhesive 4 is a two-component polyester adhesive of an unsaturated polyester and benzoyl peroxide, dimethyl-p-toluidine and cobalt octoate.
5. Reactive adhesive 5 is a two-component methacrylate adhesive of polyurethane dimethacrylate and benzoyl peroxide.

The following tests were carried out with the above smoothing compositions.

EXAMPLE 1

A strand of the smoothing composition (see Table 1 below) is applied centrally to the rounded edge of a 19 mm chipboard with a softforming profile (round profile with a radius of 20 mm). The quantity is gauged in such a way that the edge is completely covered after the subsequent pressing step.

The edge coated with the smoothing composition is pressed against a heated metal rail of which the surfaces are adapted to the rounded chipboard edge. To prevent adhesion to the metal rail, silicone paper is used as an interlayer. The surface temperature of the heated metal rail: see Table I.

After the contact time shown in Table 1, the chipboard workpiece is unclamped and pressed briefly against a similarly rounded cold metal rail to accelerate cooling.

With all the adhesive systems mentioned, the smoothing composition is cured. The edge bead formed can be completely removed with a razor blade.

TABLE 1

| Smoothing composition | Temperature of metal rail | Contact time | Result |
| --- | --- | --- | --- |
| Reactive adhesive 1 | 150° C. | 10 secs. | Hard, completely smooth surface |
| Reactive adhesive 2 | 150° C. | 4–5 secs. | Hard, completely smooth surface |
| Reactive adhesive 3 | 150° C. | 15 secs. | Hard completely smooth surface |
| Reactive adhesive 4 | | | Hard, completely smooth surface |
| Reactive adhesive 5 | | | Hard, completely smooth surface |

EXAMPLE 2

The two-component PUR adhesive is applied as smoothing composition to the surface of a flexible material—as listed in Table 2—which has an adhesive-repellent coating. The quantity is gauged in such a way that the edge is completely covered after the subsequent pressing step.

The material coated with the smoothing composition is pressed against the surface of the rounded chipboard edge (as described in Example 1) and cured by a heated metal rail (as in Example 1). The surface temperature of the heated metal rail: see Table 2.

After the contact time shown in Table 2, the chipboard workpiece is unclamped and pressed briefly against a similarly rounded cold metal rail to accelerate cooling.

The flexible material can be completely removed from the hardened chipboard edge.

TABLE 2

| Substrate material | Smoothing composition | Temperature of metal rail | Contact time | Result |
| --- | --- | --- | --- | --- |
| Silicone paper | Reactive adhesive 1 | 150° C. | 10 secs. | Hard, completely smooth surface |
| Silicone paper | Reactive adhesive 2 | 150° C. | 4–5 secs. | Hard, completely smooth surface |
| Teflonized Kevlar cloth | Reactive adhesive 2 | 150° C. | 7 secs. | Hard, completely smooth surface |
| Teflonized steel band (0.05 mm) | Reactive adhesive 2 | 150° C. | 3 secs. | Hard, completely smooth surface |

EXAMPLE 3

A strand of the colored smoothing composition (see Table 3 below) is applied centrally to the rounded edge of a 19 mm chipboard with a softforming profile (round profile with a radius of 20 mm). The quantity is gauged in such a way that the edge is completely covered after the subsequent pressing step.

The edge coated with the colored smoothing composition is pressed against a heated metal rail of which the surface is adapted to the rounded chipboard edge. To prevent adhesion to the metal rail, silicone paper is used as an interlayer. The surface temperature of the heated metal rail: see Table 3.

After the contact time shown in Table 3, the chipboard workpiece is unclamped and pressed briefly against a similarly rounded cold metal rail to accelerate cooling.

With all the adhesive systems mentioned, the smoothing composition is cured and has a uniformly colored surface. The edge bead formed can be completely removed with a razor blade.

TABLE 3

| Smoothing composition | Temperature of metal rail | Contact time | Result |
| --- | --- | --- | --- |
| Reactive adhesive 1 | 150° C. | 10 secs. | Hard, completely smooth white surface |
| Reactive adhesive 2 | 150° C. | 15 secs. | Hard completely smooth blue surface |
| 2C epoxy adhesive 3 with 5% titanium dioxide | 150° C. | 4 secs. | Hard, completely smooth white surface |

EXAMPLE 4

(Edge Bending)

The adhesive is applied to the surface of 0.6 mm thick oak veneer or a film as listed in Table 4 (paper- or plastic-based).

The material coated with the adhesive is pressed against the surface of the rounded chipboard edge (as described in Example 1) and cured by a heated metal rail (as in Example 1). The surface temperature of the heated metal rail: see Table 4.

After the contact time shown in Table 4, the chipboard workpiece is unclamped and pressed briefly against a similarly rounded cold metal rail to accelerate cooling.

The flexible material is completely bonded to the rounded chipboard edge. The adhesive joint in the edge zone is not visible with the naked eye. The surface of the material stuck on is extremely smooth and has no undulation.

TABLE 4

| Coating material | Smoothing composition | Temperature of metal rail | Contact time | Result |
| --- | --- | --- | --- | --- |
| Oak veneer, 0.6 mm | Reactive adhesive 1 | 150° C. | 12 secs. | Completely smooth surface |
| Decorative paper film (75 g/m²) | Reactive adhesive 2 | 150° C. | 4 secs. | Completely smooth surface |
| Alkorcell film | Reactive adhesive 2 | 150° C. | 4 secs. | Completely smooth surface |
| Monolayer edge Igrafol (Bausch) | Reactive adhesive 2 | 150° C. | 5 secs. | Completely smooth surface |

What is claimed is:

1. A surface improving process comprising the steps of:
   (a) applying a formable coating material to an edge of a wood-based material;
   (b) forming the applied formable coating material by smoothing, modeling or both smoothing and modeling to achieve a smoothed edge surface on the wood-based material; and
   (c) heating the applied formable coating to form closed pores while maintaining said smoothed surface intact wherein only the wood based material contains a blowing agent for the formable coating material.

2. The surface improving process of claim 1 wherein the formable coating material is reactive.

3. The surface improving process of claim 2 wherein the formable coating material is a one-component system based on polyurethane, polyester, poly(meth)acrylate or epoxide.

4. The surface improving process of claim 2 wherein the formable coating material is a two-component system based on polyurethane, polyester, poly(meth)acrylate, or epoxide.

5. The surface improving process of claim 1 wherein the formable coating material is thermoplastic.

6. The surface improving process of claim 1 wherein said heating in step (c) is accomplished by means of at least one heatable metal block.

7. The surface improving process of claim 6 wherein the heatable metal block is maintained at a temperature in the range of 80° C. to 180° C.

8. The surface improving process of claim 6 wherein the heatable metal block and the applied formable coating are contacted for a time of between 2 and 20 seconds.

9. The surface improving process of claim 6 wherein a decorative layer is adhesively applied to the wood-based material.

10. The surface improving process of claim 9 wherein the decorative layer is an edge veneer.

11. The surface improving process of claim 1 wherein the wood-based material is selected from the group consisting of chipboards, solid wood, blockwoods, coreboards and plywood.

12. The surface improving process of claim 1 wherein the formable coating material is applied in step (a) by a means selected from the group consisting of transfer tapes, rollers, adjustable slot dies, and nozzles.

13. The surface improving process of claim 1 wherein the formable coating material is applied by pressure in step (a).

14. The surface improving process of claim 1 wherein forming step (b) is accomplished by at least one means selected from the group consisting of a transfer tape, a roller, a smoothing block, a coating knife, and sanding.

15. The surface improving process of claim 1 wherein the formable coating material is applied in step (a) by means of a transfer tape, with the formable coating material being applied to the transfer tape immediately before step (a).

16. The surface improving process of claim 1 wherein both steps (b) and (c) are accomplished by means of at least one heatable metal block.

17. The surface improving process of claim 1 wherein a decorative layer is adhesively applied to the wood-based material and said decorative layer is comprised of a member selected from the group consisting of PVC, ABS, PP, wood, and resin-impregnated paper.

18. The surface improving process of claim 1 wherein steps (b) and (c) are accomplished simultaneously.

19. A surface improving process comprising the steps of:
   (a) applying a formable coating material based on a polyurethane, polyester, poly(meth) acrylate or epoxide to an edge of a wood-based material selected from the group consisting of coreboards, solid wood blockwoods, chipboards, and plywood, and
   (b) simultaneously forming the applied formable coating material by smoothing, modeling, or both smoothing and modeling to achieve a smoothed surface an the edge of the wood-based material and
   (c) heating the applied formable coating to form closed pares while maintaining said smoothed edge surface intact wherein only the wood-based material contains a blowing agent for the formable coating material.

20. The surface improving process of claim 19 wherein the formable coating material is reactive.

21. The surface improving process of claim 19 wherein the formable coating material is a one-component system.

22. The surface improving process of claim 19 wherein the formable coating material is a two-component system.

23. The surface improving process of claim 19 wherein the formable coating material is thermoplastic.

24. The surface improving process of claim 19 wherein step (b) is accomplished by means of at least one heatable metal block.

25. The surface improving process of claim 24 wherein the heatable metal block is maintained at a temperature in the range of 80° C. to 180° C. and is contacted with the applied formable coating for a time between 2 and 20 seconds.

26. The surface improving process of claim 24 wherein a plurality of heating shoes is employed in steps (b) and (c).

27. The surface improving process of claim 19 wherein a decorative layer is adhesively applied to the wood-based material during step (b).

28. The surface improving process of claim 27 wherein the decorative layer is an edge veneer.

29. The surface improving process of claim 19 wherein the wood-based material is a chipboard.

30. The surface improving process of claim 19 wherein the formable coating material is applied in step (a) by means of a transfer tape.

31. The surface improving process of claim 30 wherein the flexible transfer tape is left on the applied formable coating material until after step (b).

32. The surface improving process of claim 19 wherein a decorative layer is adhesively applied to the wood-based material during step (b) and said decorative layer is comprised of a member selected from the group consisting of PVC, ABS, PP, wood and resin-impregnated paper.

33. A surface improving process comprising the steps of
   (a) applying a formable coating material to a decorative layer;
   (b) pressing the decorative layer with the formable coating material applied thereto against an edge of a wood-based material to achieve a smoothed edge surface on said wood-based material; and
   (c) heating the applied formable coating material to form closed pores while maintaining said smoothed edge surface intact.

34. The surface improving process of claim 33 wherein the formable coating material is reactive.

35. The surface improving process of claim 33 wherein the formable coating material is a one-component system based on polyurethane, polyester, poly(meth)acrylate or epoxide.

36. The surface improving process of claim 33 wherein the formable coating material is a two-component system based on polyurethane, polyester, poly(meth)acrylate or epoxide.

37. The surface improving process of claim 33 wherein the formable coating material is thermoplastic.

38. The surface improving process of claim 33 wherein steps (b) and (c) are accomplished by means of a heatable metal block.

39. The surface improving process of claim 38 wherein the heatable metal block is maintained at a temperature in the range of 80° C. to 180° C.

40. The surface improving process of claim 38 wherein the heatable metal block and the decorative layer are contacted for a time of between 2 and 20 seconds.

41. The surface improving process of claim 33 wherein the decorative layer is an edge veneer.

42. The surface improving process of claim 33 wherein the wood-based material comprises a member selected from the group consisting of coreboards, plywood, chipboards, solid wood and blockwoods.

43. The surface improving process of claim 33 wherein the formable coating material is applied in step (a) by a means selected from the group consisting of transfer tapes, rollers, adjustable slot dies and nozzles.

44. The surface improving process of claim 33 wherein steps (b) and (c) are performed simultaneously.

45. The surface improving process of claim 33 wherein said decorative layer is comprised of PVC, ABS, PP, wood or resin-impregnated paper.

46. The surface improving process of claim 33 wherein the formable coating material is thermosettable and is hardened during step (c).

47. A surface improving process comprising the steps of:
   (a) applying a formable coating material to a flexible layer having an adhesive-repellent coating;
   (b) pressing the flexible layer with the formable coating material applied thereto against an edge of a wood-based material to achieve a smoothed surface on said edge of said wood-based material;
   (c) heating the applied formable coating material to form closed pores while maintaining said smoothed surface intact; and
   (d) removing the flexible layer from said smoothed edge surface.

48. The surface improving process of claim 47 wherein the flexible layer is a transfer tape.

49. The surface improving process of claim 47 wherein the formable coating material is reactive.

50. The surface improving process of claim 47 wherein the formable coating material is a one-component system based on polyurethane, polyester, poly(meth)acrylate, or epoxide.

51. The surface improving process of claim 47 wherein the formable coating material is a two-component system based on polyurethane, polyester, poly(meth)acrylate or epoxide.

52. The surface improving process of claim 47 wherein the formable coating material is thermoplastic.

53. The surface improving process of claim 47 wherein steps (b) and (c) are accomplished by means of at least one heatable metal block.

54. The surface improving process of claim 53 wherein the heatable metal block is maintained at a temperature in the range of 80° C. to 180° C.

55. The surface improving process of claim 53 wherein the heatable metal block and the flexible layer are contacted for a time of between 2 and 20 seconds.

56. The surface improving process of claim 47 wherein the flexible layer is recycled for use in step (a) after removal from the smoothed surface in step (d).

57. The surface improving process of claim 47 wherein after step (c) and before step (d) the applied formable coating material is cooled by means of a cold metal rail.

58. The surface improving process of claim 47 wherein steps (b) and (c) are performed simultaneously.

59. The surface improving process of claim 47 wherein the wood-based material comprises a member selected from the group consisting of coreboards, plywood, chipboards, solid wood and block wood.

60. The surface improving process of claim 47 wherein the formable coating material is thermosettable and is hardened during step (c).

* * * * *

UNITED STATES PATENT AND TRADEMARK OFFICE
CERTIFICATE OF CORRECTION

PATENT NO.    : 6,432,237 B1
DATED         : August 13, 2002
INVENTOR(S)   : Hasenkamp et al.

It is certified that error appears in the above-identified patent and that said Letters Patent is hereby corrected as shown below:

Column 8,
Line 43, after "plywood", delete "," and insert therefor -- ; --
Line 46, delete "an", and insert therefor -- on --
Line 49, delete "pares", and insert therefor -- pores --

Signed and Sealed this

Fourteenth Day of September, 2004

JON W. DUDAS
*Director of the United States Patent and Trademark Office*